Figures 1, 2:
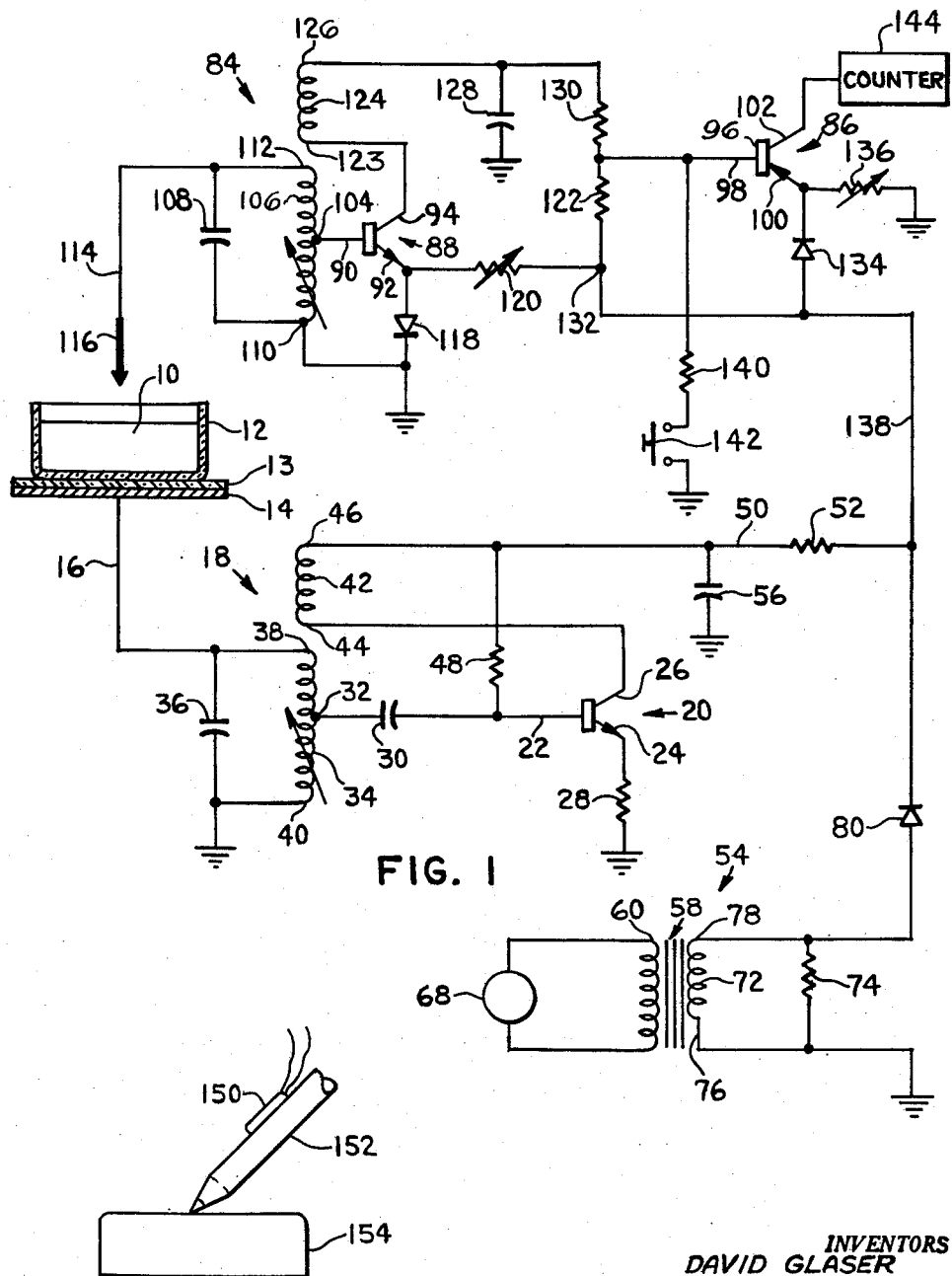

April 2, 1963  D. GLASER ET AL  3,083,909
BACTERIA-COUNTING APPARATUS
Filed April 5, 1960

INVENTORS
DAVID GLASER
FRANK V. MADAFFORE
BY
Robert A. Green

United States Patent Office 3,083,909
Patented Apr. 2, 1963

3,083,909
BACTERIA-COUNTING APPARATUS
David Glaser, Bound Brook, and Frank V. Madaffore, North Brunswick, N.J., assignors to New Brunswick Scientific Co., Inc., New Brunswick, N.J., a corporation of New Jersey
Filed Apr. 5, 1960, Ser. No. 20,204
9 Claims. (Cl. 235—92)

This invention relates to electronic apparatus for use in counting colonies of bacteria in a growth medium.

At the present time, apparatus is known for counting colonies of bacteria in a growth medium. However, such apparatus is generally unsuitable because it requires the use of two probes in contact with the nutrient medium. Such an arrangement is undesirable because both probes must be sterilized, suitable mounting or operating apparatus must be provided for one or both probes, and because in general it is undesirable to have two probes inserted in a medium if one could be employed to perform the desired operation.

The principles and objects of the invention are concerned with the provision of a novel apparatus and electrical circuit for counting colonies of bacteria, the apparatus being simple, inexpensive, and positive acting.

Briefly, the apparatus and circuit of the invention are adapted for use in counting colonies of bacteria in a growth medium in any type of container. The circuit of the invention includes a first oscillator which is coupled to the growth medium and is adapted to radiate signals into the medium. The circuit also includes a receiver for the radiated energy including a single pickup probe which is adapted to be placed in contact with growing colonies of bacteria in the growth medium. The receiver probe is coupled to an oscillator which is adapted to be turned on only in response to radiation of a predetermined magnitude and frequency picked up by the probe from the growth medium. When the oscillator is triggered, it turns on a second amplifier to which it is coupled, and it, in turn, is coupled to a counting mechanism.

The invention is described in greater detail by reference to the drawing in which:

FIG. 1 is a schematic representation of a circuit and apparatus embodying the invention; and FIG. 2 is a perspective view of auxiliary apparatus useful with the invention.

The circuit and apparatus of the invention are useful in counting colonies of bacteria which are present in a nutrient growth medium 10 held in any type of container 12. For example, the container 12 may be a glass Petri dish. According to the invention, the medium is maintained slightly electrically conductive by means of suitable well known substances such as sodium chloride or the like. The container 12 is carried on a suitable support assembly which is either conductive or includes a conductive portion. In one suitable configuration, the support assembly comprises a glass plate 13 coupled to an electrode in the form of a conductive coating 14 on its bottom surface. The electrode coating 14 may, alternatively, be in the form of a separate metal plate or ring, if desired, and comprises an antenna for radiating radio frequency waves into the nutrient medium within the container 12.

The electrode 14 is coupled through a shielded cable 16 to a radio frequency transmitter comprising any suitable oscillator 18, for example, a transistor oscillator including a NPN transistor 20 having base 22, emitter 24 and collector 26 electrodes. The emitter electrode 24 is coupled through a bias resistor 28 to ground. The base electrode 22 is coupled through a capacitor 30 to a tap 32 on a tunable inductor 34 having a capacitor 36 in parallel with it to form a tunable circuit. One end 38 of the parallel inductor-capacitor tunable circuit combination is connected through cable 16 to the electrode 14, and the other end 40 is connected to ground. The tuning of the inductor 38 controls the frequency of the oscillator 18. A regenerative coupling coil 42 is coupled to the inductor 38, and one end 44 thereof is connected to the collector electrode 26 of the transistor 20, and the other end 46 is connected through a bias resistor 48 to the base electrode 22 of the transistor. The end 46 of the coupling coil 42 is connected by a lead 50 through a bias resistor 52 to the power supply 54, and the lead 50 is connected to ground through a capacitor 56. The capacitor 56 shunts radio frequency energy to ground.

The power supply 54 is a conventional half-wave power supply and includes a transformer 58 having a primary winding 60 connected to the usual 117 volt 60 cycle power supply 68. The transformer 58 also includes a secondary winding 72 having a suitable smoothing resistor 74 connected across it and having one end 76 connected to ground and the other end 78 connected to the anode of a diode 80, the cathode of which is connected by a lead 82 through the resistor 52 to the coil 42.

The circuit of the invention also includes a receiver section including an oscillator 84 and an amplifier 86. The receiver oscillator 84 may be identical to the transmitter oscillator 18 and includes, for example, a NPN transistor 88 having base 90, emitter 92, and collector 94 electrodes. The amplifier 86 includes a PNP transistor 96 having base 98, emitter 100, and collector 102 electrodes.

The base electrode 90 of the receiver-oscillator transistor 88 is connected to a tap 104 on a tunable inductor 106 having a capacitor 108 in parallel with it to form a tunable circuit. One end 110 of the inductor 106 is connected to ground, and the other end 112 is connected through a shielded cable 114 to a receiving antenna 116 which is in the form of a conductive probe which is adapted to be placed in contact with the conductive medium within the container 12 to perform a counting operation. The emitter 92 of the transistor 88 is connected to the anode of a diode 118, the cathode of which is connected to ground. The emitter electrode 92 is also connected through a variable resistor 120 and through a bias resistor 122 to the base electrode 98 of the amplifier transistor 96. The collector 94 of the oscillator transistor 88 is connected to one end 126 of a regenerative coil 124 which is in operative relation with the tunable inductor 106. The other end 123 of the regenerative coil 124 is connected through a radio frequency bypass capacitor 128 to ground and through a bias resistor 130 to the base electrode 98 of the amplifier transistor 96.

The junction point 132 of the resistors 122 and 120 is connected to the anode of a diode 134, the cathode of which is connected to the emitter 100 of the second transistor. This emitter 100 is also connected through a variable bias resistor 136 to ground. The anode of the diode 134 is connected by a lead 138 to the cathode of diode 80. The base electrode 98 of the transistor 96 is also connected through a resistor 140 and push button switch 142 to ground. The collector electrode 102 of the amplifier transistor 96 is coupled to a suitable counting mechanism 144, which may be mechanical or electronic.

In operation of the apparatus of the invention, the oscillator 18 is biased and adjusted to be self-starting and to oscillate continuously at, for example, 500 kilocycles. Thus, oscillations are transmitted into the growth medium 10. With respect to the receiver-oscillator, which is also designed to oscillate at 500 kilocycles, the various bias components and particularly the diode 118 and resistor 120 are selected and adjusted so that each positive pulse of the power supply primes the transistor 88 and prepares it to be turned on by a signal of predetermined magnitude. Such a signal is received only when the receiving antenna 116 contacts the growth medium 10. The transistor 88 thus is adjusted to be insensitive to, and does not respond to, signals which may be received by the probe antenna when it is merely near the nutrient medium. When the power supply is turned off, the transistor 88 is automatically turned off. This expedient insures that the transistor 88 will be turned off after a counting operation. Without this arrangement, the transistor might not turn off by itself if its gain changed for any reason. The amplifier transistor 96 is also biased by the various circuit components including diode 134 and adjustable resistor 136 to respond to an output signal from the transistor 88 which results when the transistor 88 is turned on by the signal received when the probe 116 contacts the growth medium 10.

When it is desired to operate the circuit and to count colonies of bacteria, the probe 116 is placed in contact with the slightly conductive growth medium and particularly a specific colony to be counted, and a signal picked up thereby is of sufficient magnitude to turn on the first transistor 88 and cause it to oscillate. Current flow through the regenerative coil 124 is of sufficient magnitude to turn on the amplifier transistor 96, and output current from the second transistor energizes the counting apparatus 144 and causes a count to be registered. Since the probe 116 actually contacts the bacterial colony, a depression or similar identifying mark is made thereon which indicates that that colony has been counted.

One advantage of the apparatus of the invention lies in the fact that the bacteria to be counted may be in any type of container which need not be secured to the counting apparatus. In addition, the circuit elements may be arranged so that the oscillator and amplifier transistors 88 and 96, respectively, respond only to signals of a predetermined magnitude and not to spurious signals present in the vicinity of the nutrient medium. Thus, positive counting operation is achieved. In addition, the circuit provides, through the push button switch 142, auxiliary means for counting, for example, toxic bacteria which must be held in a closed container so that the probe 116 cannot touch the conductive nutrient. Thus, in one suitable arrangement shown in FIG. 2, the push button switch may comprise a miniature switch 150 which is secured, for example, to a hand-held marking pencil 152 or the like. In performing a counting operation, the marking pencil is placed in contact with the closed container 154 over a bacterial colony, and a mark is made on the surface thereof to show that a particular colony has been counted. At the same time, the switch is manually operated to turn on transistor 96 and to provide the desired count registration.

Of course it is clear that modifications may be made in the above circuit in practicing the invention. It is also clear that electron tubes and other suitable means may be used in place of, or in conjunction with, the transistors.

What is claimed is:

1. Apparatus for counting bacteria in a growth medium comprising a radio frequency oscillator and a radiating antenna for radiating radio frequency energy into the growth medium containing bacteria to be counted, a receiving antenna adapted to be brought into contact with said medium, a receiver oscillator coupled to said receiving antenna and responsive to signals received by said antenna when in contact with said medium, and count-registering mechanism coupled to the output of said receiver oscillator.

2. Apparatus for counting bacteria in a growth medium comprising support means for supporting a container carrying, in a growth medium, bacteria to be counted, said means including a conductive portion operable as an antenna to radiate radio frequency energy into the growth medium, a transmitter oscillator coupled to said conductive portion of said support means, a receiving antenna adapted to be brought into contact with said medium, a receiver oscillator coupled to said receiving antenna and responsive to signals received by said antenna when in contact with said medium, and count-registering mechanism coupled to the output of said receiver oscillator.

3. The apparatus defined in claim 2 wherein said transmitter oscillator is self-starting and said receiver oscillator is intermittently turned off and on, said receiver oscillator being biased to respond to signals of a predetermined magnitude received by said receiving antenna.

4. Apparatus for counting bacteria in a growth medium comprising support means for supporting a container carrying in a growth medium bacteria to be counted, said means including a conductive portion operable as an antenna to radiate radio frequency energy into the growth medium, a transmitting oscillator coupled to said conductive portion of said support means, a receiving antenna adapted to be brought into contact with said medium, a receiver oscillator coupled to said receiving antenna and responsive to signals received by said antenna when in contact with said medium, an amplifier coupled to said receiver oscillator, and count-registering mechanism coupled to the output of said amplifier.

5. The circuit defined in claim 4 wherein said receiver oscillator is adapted to respond to signals of a predetermined magnitude received by said receiving antenna when in contact with said medium, said amplifier being biased to respond only to the output of said receiver oscillator when energized by said signals of predetermined magnitude.

6. Apparatus for counting bacteria in a growth medium comprising support means for supporting a container carrying in a growth medium bacteria to be counted, said means including a conductive portion operable as an antenna to radiate radio frequency energy into the growth medium, a transmitting oscillator coupled to said conductive portion of said support means, a receiving antenna adapted to be brought into contact with said medium, a receiver oscillator coupled to said receiving antenna and responsive to signals received by said antenna when in contact with said medium, auxiliary means coupled to said receiver oscillator for insuring its turning off, and count-registering mechanism coupled to the output of said receiver oscillator.

7. The apparatus defined in claim 6 wherein said auxiliary means comprises a half-wave power supply which biases said receiver oscillator so that it can be turned on by a received signal, said power supply also turning off said receiver oscillator after a signal has been received and a count has been registered.

8. Apparatus for counting bacteria in a growth medium comprising a tunable transmitter oscillator and a radiating antenna for radiating energy into the growth medium containing bacteria to be counted, a receiving antenna adapted to be brought into signal receiving relation with said medium, a tunable receiver oscillator coupled to said receiving antenna and responsive to signals received by said antenna when in said signal receiving relation with said medium, and utilization means coupled to the output of said receiver oscillator and adapted to respond to signals received from said transmitter oscillator.

9. Apparatus for counting bacteria in a growth medium comprising a tunable radio frequency oscillator and a radiating antenna for radiating radio frequency energy into the growth medium containing bacteria to be counted,
    a receiving antenna adapted to be brought into signal receiving relation with said medium,
    a tunable receiver oscillator coupled to said receiving antenna and responsive to signals received by said antenna when in signal receiving relation with said medium,
    and count-registering mechanism coupled to the output of said receiver oscillator.

References Cited in the file of this patent
UNITED STATES PATENTS

| | | |
|---|---|---|
| 2,474,156 | Namenyi-Katz | June 21, 1949 |
| 2,548,478 | Kavanaugh | Apr. 10, 1951 |
| 2,656,508 | Coulter | Oct. 20, 1953 |